June 2, 1942.   S. B. CRARY   2,285,191
AUTOMATIC RECLOSING CIRCUIT BREAKER EQUIPMENT
Filed Dec. 28, 1940
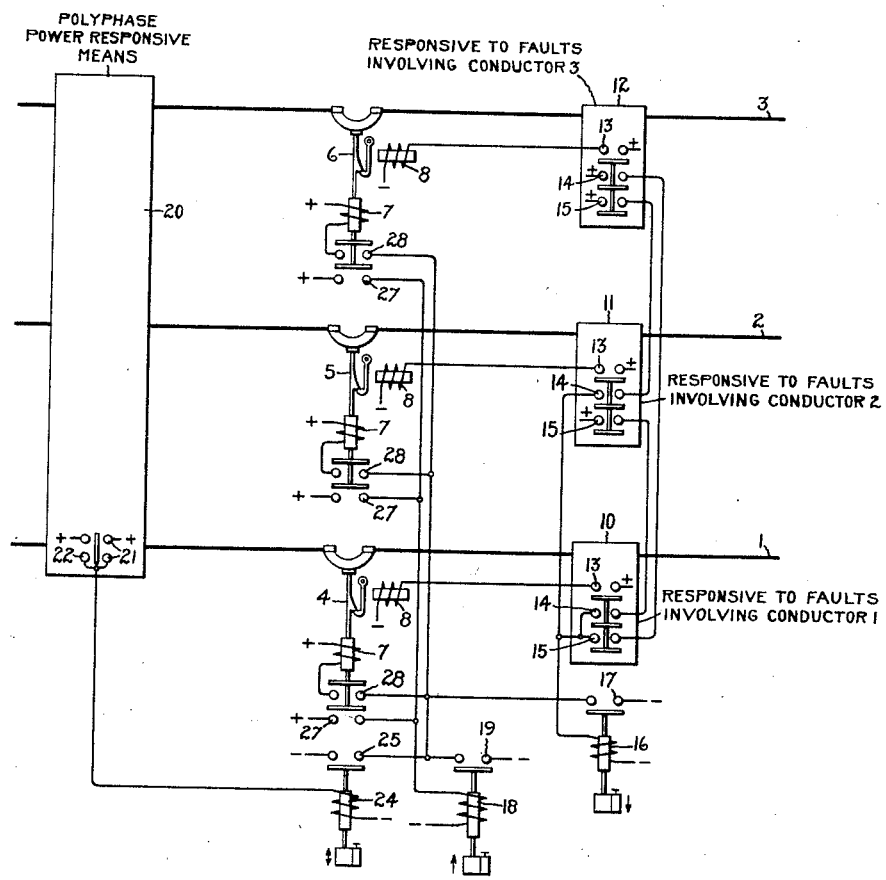
Inventor:
Selden B. Crary,
by Harry E. Dunham
His Attorney Patented June 2, 1942

2,285,191

UNITED STATES PATENT OFFICE 2,285,191

AUTOMATIC RECLOSING CIRCUIT BREAKER EQUIPMENT

Selden B. Crary, Schenectady, N. Y., assignor to General Electric Company, a corporation of New York Application December 28, 1940, Serial No. 372,103

10 Claims. (Cl. 175—294)

My invention relates to automatic reclosing circuit breaker equipments and particularly to an equipment for controlling the reclosing of single pole circuit breakers in a polyphase circuit, and one object of my invention is to provide an improved arrangement of apparatus for reclosing such a single pole circuit breaker after it has been opened by a fault involving the associated line conductor.

As a result of considerable study of single pole switching for the clearing of faults on polyphase lines, I have found that the length of time that a single pole circuit breaker in a polyphase line should be maintained open without resulting in loss of synchronism of the connected rotating apparatus system, in order to provide a maximum factor of safety for deionization of the arcing path and for restriking of the lightning stroke due to multiple stroke phenomena, varies inversely with the amount of power being transferred over the line at the time the fault occurs. Also in some cases the time that the single pole circuit breakers should remain open before being reclosed depends upon the type of fault, namely whether it is a line to ground, double line to ground, or a three-phase fault.

In accordance with my invention, I provide an arrangement of apparatus for controlling the reclosing of a single pole circuit breaker in a polyphase circuit so that, when a relatively small amount of power is being transferred at the time a fault, involving the associated line conductor, occurs a much longer time elapses between the opening and the reclosure of the circuit breaker than elapses when a relatively large amount of power is being transferred at the time such a fault occurs. Also in those instances where it is necessary, the length of time that the single pole circuit breaker is maintained open is modified in accordance with the type of fault. For example, for a line to ground fault involving only one conductor, the single pole circuit breaker associated with that conductor involved in the fault may be reclosed after being opened for a different predetermined time interval than when the fault involves that conductor and another.

My invention will be better understood from the following description when taken in connection with the accompanying drawing, the single figure of which illustrates an automatic reclosing circuit breaker arrangement embodying my invention, and the scope of my invention will be pointed out in the appended claims.

Referring to the drawing, 1, 2 and 3 are the three line conductors of a three-phase circuit, and 4, 5 and 6 represent suitable single pole circuit breakers in the line conductors 1, 2 and 3, respectively. Each circuit breaker is shown as a latched closed circuit breaker having a closing coil 7 and a trip coil 8. Each circuit breaker also has associated therewith suitable fault responsive means for effecting the energization of the associated trip coil 8 in response to a fault involving the associated line conductor. Since such fault responsive means are well known in the art and my invention does not relate to the details thereof, I have represented such fault responsive means for the conductors 1, 2 and 3 by rectangles 10, 11 and 12, respectively. Each of these fault responsive means includes three sets of contacts 13, 14 and 15 which are closed in response to a fault involving the associated line conductor. The closing of the contacts 13 of each fault responsive means completes an energizing circuit for the trip coil 8 of the circuit breaker in the associated line conductor. The contacts 14 and 15 of the fault responsive means 10, 11 and 12 are interconnected so as to effect the energization of an associated quick acting relay 16 in case any two of the fault responsive means are simultaneously operated in response to a fault involving two or more of the line conductors. The relay 16 is preferably designed in any suitable manner so that its contacts 17 remain closed for a predetermined time after the relay is deenergized. These contacts 17, when closed, complete an energizing circuit for the closing coil 7 of each circuit breaker, which is then open, so as to effect the immediate reclosing thereof.

In order to effect the reclosing of a circuit breaker after being opened for a relatively long time interval, when the fault which effects the opening of the circuit breaker involves only the associated line conductor, I provide a time delay relay 18, which is energized in response to the opening of each circuit breaker and which, after being energized for a predetermined length of time, closes its contacts 19 which are so connected that, when they are closed, they complete an energizing circuit for the closing coil 7 of each circuit breaker which is then open.

However, in order to effect the reclosing of a circuit breaker before the time delay relay 18 has completed its timing operation in case the power being transferred at the time a fault involving only the associated line conductor occurs, I provide a three-phase wattmeter 20, which is connected to the line conductors 1, 2 and 3, in any suitable manner examples of which are well known in the art so that either contacts 21 or 22, depending upon the direction of power flow through the conductors 1, 2 and 3, are closed when the amount of power flow exceeds a predetermined value. In order to simplify the disclosure, I have represented the wattmeter 20 merely by a rectangle since the detailed connections of such a device are well known in the art, and my present invention does not relate to such detailed connections. The contacts 21 and 22 are connected in parallel in an energizing circuit for a time relay 24 so that its contacts 25 are closed after the contacts 21 or 22 have remained closed for a predetermined time limit. The contacts 25, when closed, complete an energizing circuit for the closing coil 7 of any circuit breaker which may be opened at that time.

The operation of the arrangement shown in the drawing is as follows:

When a fault involving only one of the line conductors occurs, the respective fault responsive means operates to effect the opening of the associated circuit breaker. For example, upon the occurrence of a fault involving only the line conductor 1, only the fault responsive means 10 operates to close its contacts 13, 14 and 15. The closing of the contacts 13 of the fault responsive means 10 completes an energizing circuit for the trip coil 8 of the circuit breaker 4 so as to effect the opening thereof. As soon as the circuit breaker 4 opens, its auxiliary contacts 27 complete an energizing circuit for the time delay relay 18, but this relay does not close its contacts 19 until a predetermined time after the relay 18 is energized. When the relay 18 closes its contacts 19, a circuit is completed for the closing coil 7 of the open circuit breaker 4 through the auxiliary contacts 28 thereof to effect the closing of the circuit breaker 4.

If at the time the fault involving only the line conductor 1 occurs, the power being transferred is above a predetermined value so that one of the two sets of contacts of the relay 20 has been closed long enough to cause the contacts 25 of the relay 24 to be closed, the circuit of the closing coil 7 of the circuit breaker 4 is closed as soon as the auxiliary contacts 28 of the circuit breaker 4 are closed, and this occurs before the time relay 18 completes its timing operation. Therefore, it will be seen that, if the power being transferred through the conductors 1, 2 and 3 is above a predetermined value when a fault occurs which involves only one line conductor, the circuit breaker associated with the faulty line conductor is immediately reclosed whereas if the power is below this predetermined value when the fault occurs, the circuit breaker is not reclosed until after it has remained opened for a relatively long predetermined time interval.

When a fault involving more than one line conductor occurs, the fault responsive means associated with each of the involved line conductors closes its respective contacts 13, 14 and 15. For example, if the fault involves both of the conductors 2 and 3, the fault responsive means 11 and 12 close their respective contacts 13, 14 and 15. The closing of the contacts 13 of the fault responsive means 11 completes an energizing circuit for the trip coil 8 of the circuit breaker 5, and the closing of the contacts 13 of the fault responsive means 12 completes an energizing circuit for the trip coil 8 of the circuit breaker 6 so that both of these circuit breakers are opened. Also an energizing circuit is completed for the instantaneous relay 16 through the contacts 14 of the fault responsive means 11 and the contacts 15 of the fault responsive means 12 in series. By closing its contacts 17, the relay 16 immediately completes an energizing circuit through the closing coil 7 and the auxiliary contacts 28 of each of the open circuit breakers 5 and 6. Therefore, when the fault involves more than one line conductor, the circuit breakers associated with the involved line conductors are immediately reclosed irrespective of the amount of power being transferred at the time the fault occurs.

While I have, in accordance with the patent statutes, shown and described my invention as applied to a particular system and as embodying various devices diagrammatically indicated, changes and modifications will be obvious to those skilled in the art, and I therefore aim in the appended claims to cover all such changes and modifications as fall within the true spirit and scope of my invention.

What I claim as new and desire to secure by Letters Patent of the United States is:

1. In combination, a polyphase circuit, a single pole circuit breaker in series with each phase conductor of said circuit, means for opening each breaker in response to a fault involving the associated phase conductor, and means for reclosing a circuit breaker after a time interval which depends upon the number of phase conductors involved in the fault.

2. In combination, a polyphase circuit, a single pole circuit breaker in series with each phase conductor of said circuit, means for opening each breaker in response to a fault involving the associated phase conductor, and means for reclosing a circuit breaker after a time interval which depends upon the amount of polyphase power being transferred when the fault occurs.

3. In combination, a polyphase circuit, a single pole circuit breaker in series with each phase conductor of said circuit, means for opening each breaker in response to a fault involving the associated phase conductor, and means for reclosing a circuit breaker after different time intervals dependent upon the amount of polyphase power being transferred when the fault occurs.

4. In combination, a polyphase circuit, a single pole circuit breaker in series with each phase conductor of said circuit, means for opening each breaker in response to a fault involving the associated phase conductor, and means for reclosing a circuit breaker after a relatively short time interval when the amount of power being transferred when the fault occurs exceeds a predetermined amount and after a relatively long time interval when the amount of power being transferred when the fault occurs is less than said predetermined value.

5. In combination, a polyphase circuit, a single pole circuit breaker in series with each phase conductor of said circuit, means for opening each breaker in response to a fault involving the associated phase conductor, means for reclosing a circuit breaker after a time interval dependent upon the amount of power being transferred when the fault occurs, and means for reclosing a circuit breaker after a different time interval which depends upon the number of conductors involved in the fault.

6. In combination, a polyphase circuit, a single pole circuit breaker in series with each phase conductor of said circuit, means for opening each breaker in response to a fault involving the associated phase conductor, means for reclosing a circuit breaker after a predetermined time interval when the amount of power being transferred when the fault occurs is less than a predetermined amount, means for reclosing a circuit breaker before the expiration of said predetermined time interval when the amount of power being transferred when the fault occurs is above said predetermined value, and means for reclosing a circuit breaker before the expiration of said predetermined time interval when the fault involves more than one conductor of said circuit.

7. In combination, a polyphase circuit, a single pole circuit breaker in series with each phase conductor of said circuit, means for opening each breaker in response to a fault involving the associated phase conductor, and means for reclosing a circuit breaker after a predetermined time interval when the amount of power being transferred when the fault occurs is less than a predetermined amount and before the expiration of said predetermined time interval when the amount of power being transferred when the fault occurs is above said predetermined value.

8. In combination, a polyphase circuit, a single pole circuit breaker in series with each phase conductor of said circuit, means for opening each breaker in response to a fault involving the associated phase conductor, and means for reclosing a circuit breaker after a predetermined time interval when the amount of power being transferred when the fault occurs is less than a predetermined amount and before the expiration of said predetermined time interval when the fault involves more than one conductor of said circuit.

9. In combination, a polyphase circuit, a single pole circuit breaker in series with each phase conductor of said circuit, means for opening each breaker in response to a fault involving the associated phase conductor, and means for reclosing a circuit breaker after a predetermined time interval when the fault involves only the associated circuit conductor and before the expiration of said time interval when the fault involves more than one circuit conductor.

10. In combination, a polyphase circuit, a single pole circuit breaker in series with each phase conductor of said circuit, means for opening each breaker in response to a fault involving the associated phase conductor, and means for reclosing a circuit breaker after different time intervals dependent upon the number of circuit conductors involved in the fault.

SELDEN B. CRARY.